United States Patent
Collin et al.

(10) Patent No.: US 6,240,166 B1
(45) Date of Patent: May 29, 2001

(54) LAN CONNECTION USING ANALOG MODEMS VIA TELEPHONE WIRING

(75) Inventors: Zeev Collin, Herzliya; Ilan Taler; Nir E. J. Tal, both of Tel Aviv, all of (IL)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/207,650

(22) Filed: Dec. 8, 1998

(51) Int. Cl.$^7$ .................................................. H04M 11/00

(52) U.S. Cl. ................................. 379/93.08; 379/90.01; 370/445

(58) Field of Search ................. 379/90.01, 93.01–93.09, 379/93.14, 93.21, 93.28, 93.37, 110.01, 156–173, 387, FOR 112, FOR 115, FOR 116; 370/445, 450, 481, 488–497; 375/288, 222; H04N 7/14

(56) References Cited

U.S. PATENT DOCUMENTS

| | | | |
|---|---|---|---|
| 4,757,497 | * 7/1988 | Beierle et al. | 370/493 |
| 5,535,265 | * 7/1996 | Suwandhaputra | 379/93.28 |
| 5,699,413 | 12/1997 | Sridhar . | |
| 5,841,840 | * 11/1998 | Smith et al. | 379/93.01 |
| 5,896,443 | * 4/1999 | Dichter | 379/93.01 |

FOREIGN PATENT DOCUMENTS 0 831 624 A2   3/1998 (EP) .............................. H04L/27/00

OTHER PUBLICATIONS

Peter S. Chow and John M. Cioffi, "A Multi–drop In–house ADSL Distribution Network," *International Conference on Communications(ICC)*, IEEE, Jan. 1994, pp. 456–460.

Johna Till Johnson, "LAN Modems: The Missing Link for Remote Connectivity," *8178 Data Communications International*, vol. 22, No. 4, Mar. 1993, pp. 101–106.

* cited by examiner

Primary Examiner—Wing F. Chan
(74) Attorney, Agent, or Firm—Akin, Gump, Strauss, Hauer & Feld, LLP

(57) ABSTRACT

A communication system according to the present invention includes a first communication device having a first digital signal processor and a first codec and a second communication device having a second digital signal processor and a second codec. The second communication device is communicatively coupled with the first communication device via a communication channel. The first digital signal processor enables frequency division multiplexed sampling of signals from the first codec, and the second digital signal processor enables receipt of the division multiplexed sampling of signals from the first digital signal processor such that the sampling of signals is transmitted to the second codec in a manner so as not to interfere with other communications of the first communication device.

19 Claims, 7 Drawing Sheets

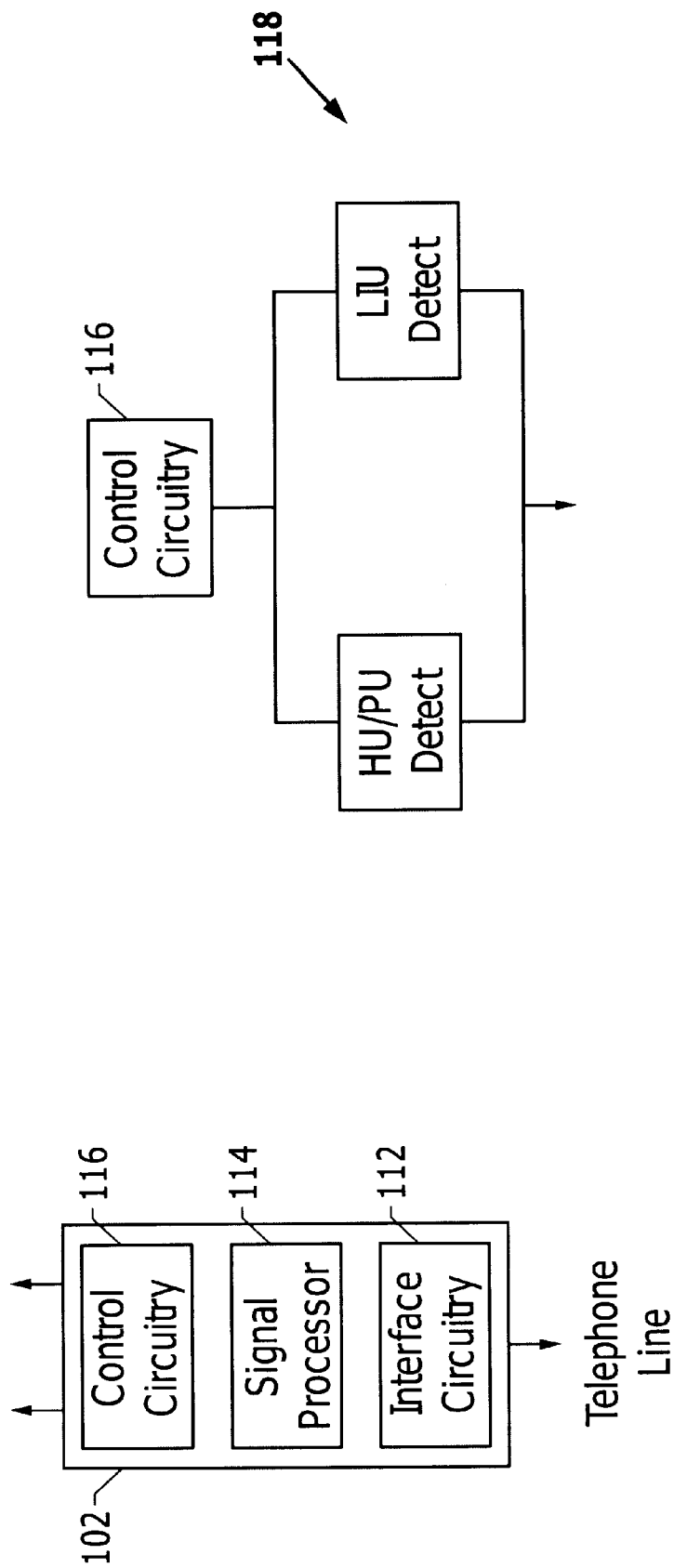

LAN CONNECTION USING ANALOG MODEMS VIA TELEPHONE WIRING

CROSS-REFERENCE TO RELATED APPLICATIONS

The present application hereby incorporates by reference U.S. patent application Ser. No. 09/136,789 (Attorney Docket Number 98RSS196CIP), filed Aug. 19, 1998, pending, which is a continuation-in-part of U.S. patent application Ser. No. 09/096,851 (Attorney Docket Number 98RSS196), filed Jun. 11, 1998, pending, both of which are incorporated by reference in their entirety.

BACKGROUND

1. Field of the Invention

The present invention relates to a computer communication system and more particularly to a modem communication system where modems communicate across standard telephone lines within a premises using frequency division multiplexing.

2. Description of the Related Art

Modem communication over telephone lines has gained widespread usage with the growing number of multi-media applications implemented using personal computers. Personal computers (PCs) now perform many different types of data transfers over telephone lines, such as accessing the "Internet," communicating data files between PCs, sending and receiving facsimiles, and acting as an answering machine by sending and receiving voice information over the telephone lines. Modems are used to convert between a computer's digital signals and analog signals that can be carried on the telephone network's analog transmission lines.

Traditionally, at the core of a modem, is a digital signal processor (DSP) integrated circuit (IC), a memory, a codec, and a data access arrangement (DAA). A codec includes a digital to analog converter (D/A) and an analog to digital converter (A/D). The modem is typically coupled to a host computer bus through standard bus interface circuitry to thereby interact with a host computer. The host computer includes a central processing unit (CPU) that generates data that is to be transmitted through the modem and to receive data that is passed through the modem.

DSP based modems generally operate by processing a relatively small number of samples from the input A/D converter and generating a similarly small number of samples to be output through the D/A converter. These systems are said to work on a "sample by sample" basis or a "symbol by symbol" basis, depending on the particular implementation. Such schemes have the benefit of minimal latency time, since the input is processed almost immediately. These schemes, however, require very high computing power which is typically provided by a dedicated DSP.

In recent years, modems have been developed that operate using DSPs implemented in software. However, although software DSPs enable sampling rates to substantially increase without a corresponding increase in hardware expenses, these software DSPs operate similar to standard hardware DSPs by sampling and transmitting signals at or slightly above the "voice band". The voice band is approximately 4 kHz and has been recognized as the voice band because telephone lines typically operate with exchange circuitry, e.g., a central office or private branch exchange (PBX), configured with low pass circuitry that cuts off signals that have been transmitted at frequencies above the voice band. Thus, modem signals are typically transmitted in the voice band and DSPs sample the signals at a minimal frequency rate, i.e., twice the rate of the highest freqency of the signal being sampled, or the "Nyquist rate".

SUMMARY OF THE INVENTION

A communication system according to the present invention includes a first communication device having a first digital signal processor and a first codec and a second communication device having a second digital signal processor and a second codec. The second communication device is communicatively coupled with the first communication device via a communication channel. The first digital signal processor enables frequency division multiplexed sampling of signals from the first codec, and the second digital signal processor enables receipt of the division multiplexed sampling of signals from the first digital signal processor such that the sampling of signals is transmitted to the second codec in a manner so as not to interfere with other communications of the first communication device.

Of particular note, the communication system sometimes creates the communication channel with a telephone wire network that has no exchange circuitry and is completely within a premises. Often, the first communication device and the second communication device each comprise a voice band modem. The communication system also allows the first communication device to communicatively couple with at least one external communication device via another communications channel. In this embodiment, the first communication device communicates with the at least one external communication device transparently to the communications between the first communication device and the second communication device.

In other embodiments, the communication system allows the first communication device to communicate with the second communication device outside of the voice band. The communication system could also include a first processor associated with the first communication device such that the first processor influences, via the communication channel, operation of peripheral devices that are coupled to a second processor associated with the second communication device.

With the communication system herein described, a user can communicate between a first and a second computer system. The first computer system has a first voice-band modem and the second computer system has a second voice-band modem, the first voice-band modem and the second voice-band modem communicatively coupled across a telephone line network. The user communicates between the computer systems by configuring the first voice band modem to transmit and receive signals at frequencies both within and without the voice band, configuring the second voice band modem to transmit and receive signals at frequencies both within and without the voice band, transmitting signals from the first computer system to the second computer system across the telephone line network at a frequency outside of the voice band without interfering with voice band communications of the first computer system, and receiving, from the telephone line network, signals at the second computer system at the frequency outside of the voice band without interfering with voice band communications of the second computer system.

In addition, the user can communicate between systems by transmitting signals from the second computer system to the first computer system across the telephone line network at a frequency outside of the voice band without interfering with voice band communications of the second computer system, and receiving, from the telephone line network, signals at the first computer system at the frequency outside of the voice band without interfering with voice band communications of the first computer system. Further, the user communicates by controlling, with the first computer system and through communications across the telephone line network, peripheral devices attached to the second computer system, the communications passing transparently to other communications on the telephone line network.

In another embodiment according to principles of the present invention, a communication system includes a first voice band modem; a second voice band modem; a telephone wire network within a premises and without exchange circuitry within the premises. The first voice band modem is communicatively coupled to the second voice band modem via the telephone wire network such that the first voice band modem communicates, outside of the voice band, with the second voice band modem.

In the communication system, the first voice band modem may be communicatively coupled across another telephone wire network to another communication device for voice band communications. In addition, communication signals between the first voice band modem and the second voice band modem are multiplexed in the frequency domain as well as communication signals between the first voice band modem and an external communication device being multiplexed in the frequency domain. In addition, the first voice band modem often communicates with an external communication device that is communicatively coupled to the first voice band modem on a communication network external to the telephone wire network within the premises, the communication occurring transparently to the communications between the first voice band modem and the second voice band modem. Still further, the first voice band modem can be associated with a processor, wherein the processor is allowed to operate peripheral devices of another processor that is associated with the second voice band modem.

In yet another embodiment according to principles of the present invention, a telephone line network system includes telephone lines configured to allow communications between network devices. A plurality of network devices is communicatively coupled to the telephone lines with each of the plurality of network devices including a communication module that enables communication between at least two of the plurality of network devices. At least one communication channel on the telephone lines enables the communication between the at least two of the plurality of network devices. In addition, each of the plurality of network devices includes a control module that enables each network device to selectively communicate on the at least one communication channel.

In embodiments in which the telephone line network system includes a standard telephone communicatively coupled thereto, the communication module comprises detection circuitry that indicates appropriate communication channels that are to be activated for each of the plurality of network devices according to a mode of the standard telephone. It should be noted that the at least one communication channel of the telephone line network system may comprise a voice band channel and a non-voice band channel.

BRIEF DESCRIPTION OF THE DRAWINGS

A better understanding of the present invention can be obtained when the following detailed description of the preferred embodiment is considered in conjunction with the following drawings.

FIG. 1B is a block diagram of an exemplary network device for communicating on a telephone line network.

FIG. 1C is a block diagram of exemplary detection circuits for telephone line-in-use, extension pick-up, and remote hang-up.

DETAILED DESCRIPTION OF THE DRAWINGS

Figure 1A:
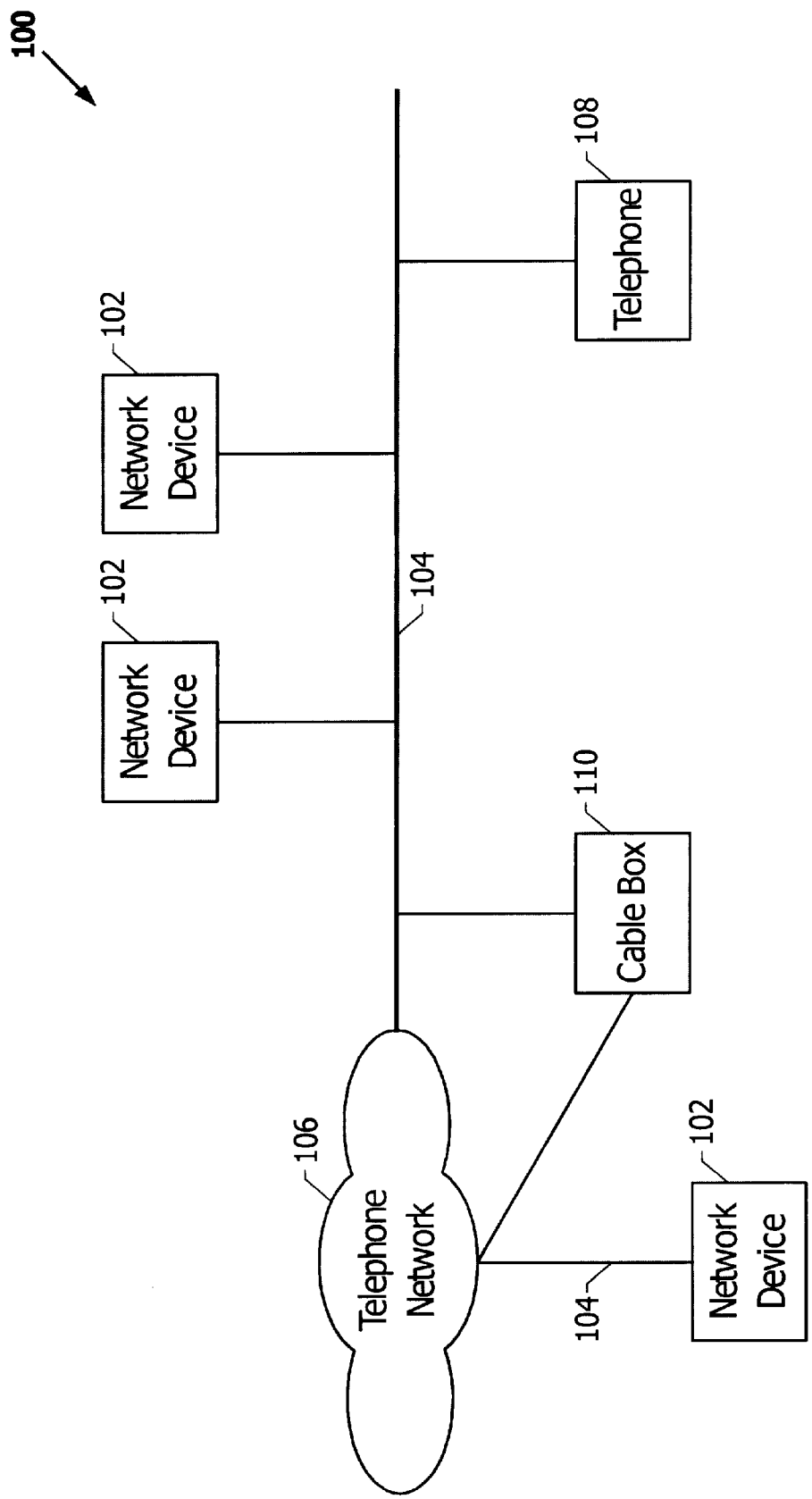
FIG. 1A is a block diagram of an exemplary network system having multiple network devices communicatively coupled to each other for communication on the network system.

FIG. 1A is a block diagram of an exemplary network system 100 having multiple network devices 102 communicatively coupled to each other for communication on the network system 100. In this embodiment, the network system 100 operates across telephone lines 104 and an independent telephone network 106. Communicatively coupled to the telephone lines 104 is a standard telephone 108 having telephone circuitry for entering various modes, e.g., on hook, off hook, line-in-use, etc. On hook mode represents the telephone 108 when it does not utilize any of the bandwidth available on the telephone lines 104. Off hook mode represents that mode in which some bandwidth on the telephone line 104 is made available for the telephone 108 to use for communication across the telephone lines 104 and possibly the telephone network 106. Finally, line-in-use mode is that mode when the telephone 108 actually makes use of the available bandwidth existing in the off hook mode.

The network devices 102 are configured such that they can communicate with one another either across the telephone lines 104 only, or across both the telephone lines 104 and the telephone network 106. In this manner, the network devices 102 provide one of the advantages of the present invention. The telephone lines 104 can be used by the network devices 102 to communicate by sending communication signals at full bandwidth, or having a portion of the bandwidth released, such as the voice band for use by the telephone 108 while multiple network devices 102 continue to communicate using a frequency other than the voice band. Advantageously, a single network device 102 can operate using multiple bandwidths when the bandwidth is divided into multiple communication channels such as the voice band and a high band. This operation at multiple bandwidths is particularly useful when the network device 102 creates a communication channel across the telephone network 106 for communication at the voice band and also creates another communication channel across the telephone lines 104 for communication above the voice band.

It should be noted that the network devices 102, rather than communicating directly across the telephone network 106, can communicate using a cable box 110 to access other network devices 102. Of course, network devices 102 having advantages such as multiple bandwidth operation are still available when the network system 100 includes the cable box 110.

FIG. 1B is a block diagram of an exemplary network device 102 for communicating on a telephone line network. Included in the network device 102 is interface circuitry 112 for accepting communication signals from a telephone line. The interface circuitry 112 allows the network device 102 to communicate with at least one communication channel on the telephone line. For example, the network device 102 could be configured to communicate with a single channel that utilizes the full bandwidth of the telephone line. In addition, the network device 102 could be configured to communicate with multiple channels that each communicate using a portion of the bandwidth. Still further, the network device 102 could communicate with multiple channels that remain after releasing one of the channels in the bandwidth. Regardless of the number of communication channels operating in the bandwidth of the telephone line, for each embodiment, the interface circuitry 112 is configured to recognize signals from the telephone line.

In the instant embodiment of the network device 102, a signal processor 114 is communicatively coupled to the interface circuitry 112 to process communication signals from the telephone line. The signal processor 114 includes circuitry for processing communication signals from the various communication channels within the bandwidth of the telephone line. For example, in one embodiment, the signal processor 114 could be configured to operate using a single communication channel comprising the whole bandwidth of the telephone line. In another embodiment, the signal processor 114 could be configured with circuitry for dividing the bandwidth into signals available from only certain communication channels on the telephone line. Of course, the signal processor 114 enables communications across the telephone line according to communication parameters required by the network devices 102 with which the signal processor 114 is designed to communicate.

Still further, in the instant embodiment of the network device 102, control circuitry 116 is included in order to appropriately process the communication signals of the communication channel(s) on the telephone line. Although numerous communication lines could be used to pass the communication signals of the communication channels to additional communication circuitry, as illustrated in the network device 102 of FIG. 1B, two communication lines, representing communication channels, are used to pass communication signals to appropriate circuitry such as a processor (not shown) in a computer system.

FIG. 1C is a block diagram of exemplary detection circuits 118 for telephone line-in-use, extension pick-up, and remote hang-up. The control circuitry 116 operates according to whether a telephone line-in-use (LIU) signal, an extension pick-up (PU) signal, or a remote hang-up (HU) signal is detected. Typically, the control circuitry 116 enables the network system 100 to detect actions on the telephone lines 104 that could impact operation of one or more of the network devices 102. For example, if the network device 102 were an answering machine, the answering machine should cease operation when the telephone 108 is picked up by a user, thereby enabling uninterrupted telephone voice communication. If the telephone 108 is not picked up and a remote telephone user is able to complete their voice message on the answering machine, the answering machine requires circuitry to detect when the remote user hangs up so that it can cease its recording operations. In yet another example, if the network device 102 is a modem, the modem must detect whether a desired communication channel of the telephone line is already in use prior to attempting communications on that communication channel so that the modem can select another, unused communication channel, and avoid interruptions of communications on the communication channel. In addition, the control circuitry 116 could be configured to recognize other signals and those other signals could influence the design of the detection circuits 118. In this embodiment, the detection circuitry 118 provides the control circuitry 116 with information that allows the control circuitry 116 to determine which communication channels are to be added to the bandwidth, to be released from the bandwidth, or to remain in the bandwidth.

Figure 2:
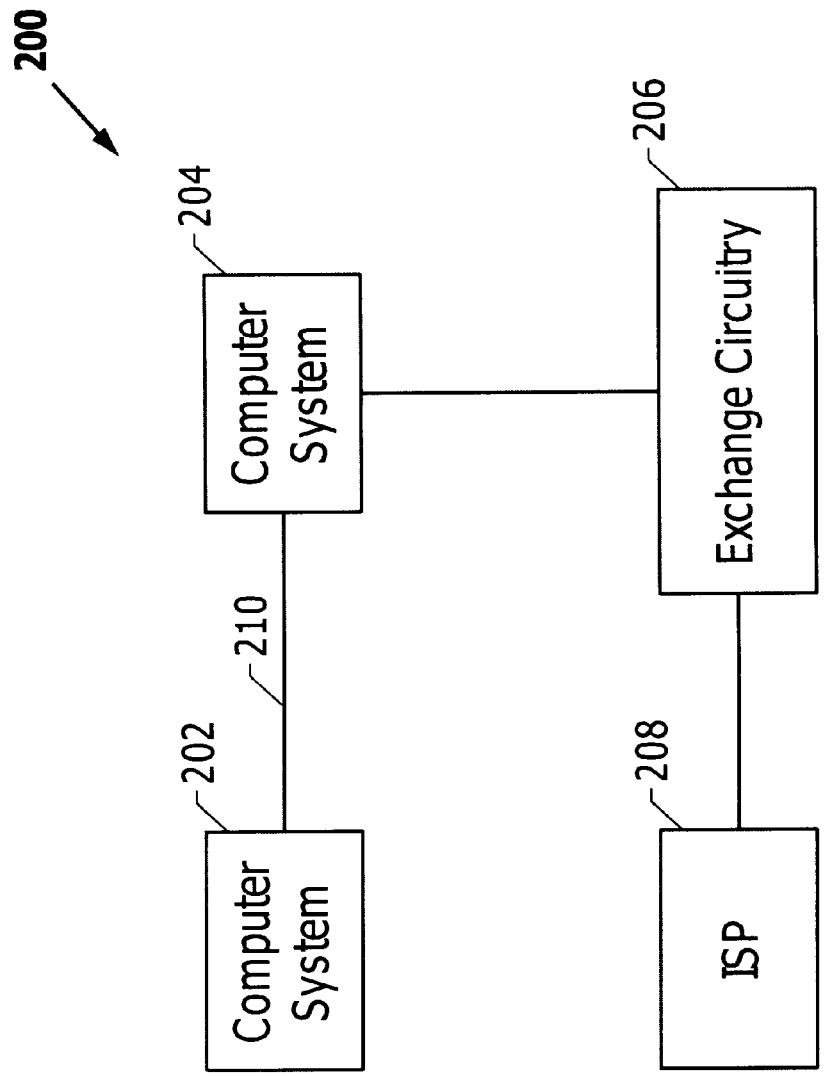
FIG. 2 is a block diagram of an exemplary computer network having multiple computer systems communicatively coupled to each other and to exchange circuitry for access to an Internet Service Provider and ultimately for connection to the Internet.

FIG. 2 is a block diagram of an exemplary computer network 200 having multiple computer systems 202 and 204 communicatively coupled to each other and to exchange circuitry 206 for access to an Internet Service Provider (ISP) 208 and ultimately for connection to the Internet. The computer systems 202 and 204 are similar to the computer system 800 (see FIG. 8) and are communicatively coupled via a communication channel 210 so that communication devices such as modems (not shown) in each of the computer systems 202, 204 provide communications across the communication channel 210. In addition, the computer system 204 of the computer network 200 is illustrated as being communicatively coupled to the exchange circuitry 206 for communication with the ISP 208 and the Internet.

The exchange circuitry 206 is circuitry that is typically found in either a private telephone network or at a local telephone office. Private telephone networks often include a private branch exchange (PBX) to share a certain number of outside lines for making telephone calls external to the PBX. If the PBX is located at the local telephone office, it is referred to as a centrex (central office exchange service) and all switching occurs at the local telephone office instead of within the premises of the private telephone network. Telephone networks that provide access to additional telephone networks beyond a local/private premises must include exchange circuitry such as a PBX or the like. Most if not all telephone networks include exchange circuitry at some level. For example, local or private networks such as a home telephone line network do not include exchange circuitry at the local or private level, however, even a home telephone line network confronts exchange circuitry when a telephone call is made on the home telephone line network.

The exchange circuitry 206 provides the computer systems 202, 204 access to the ISP 208 and the Internet. This access is typically accomplished via telephone lines with modems at each of the computer systems 202, 204 providing the communication between the respective computer system 202, 204 and to the exchange circuitry 206. Thus, the computer network 200 may be created, in part, with standard telephone lines between modems in the computer systems 202, 204. Of course, when the computer systems 202 and 204 communicate with each other via the communication channel 210, the modems of the computer systems 202, 204 operate without adversely affecting communication signals outside the communication channel 210.

Figure 3:
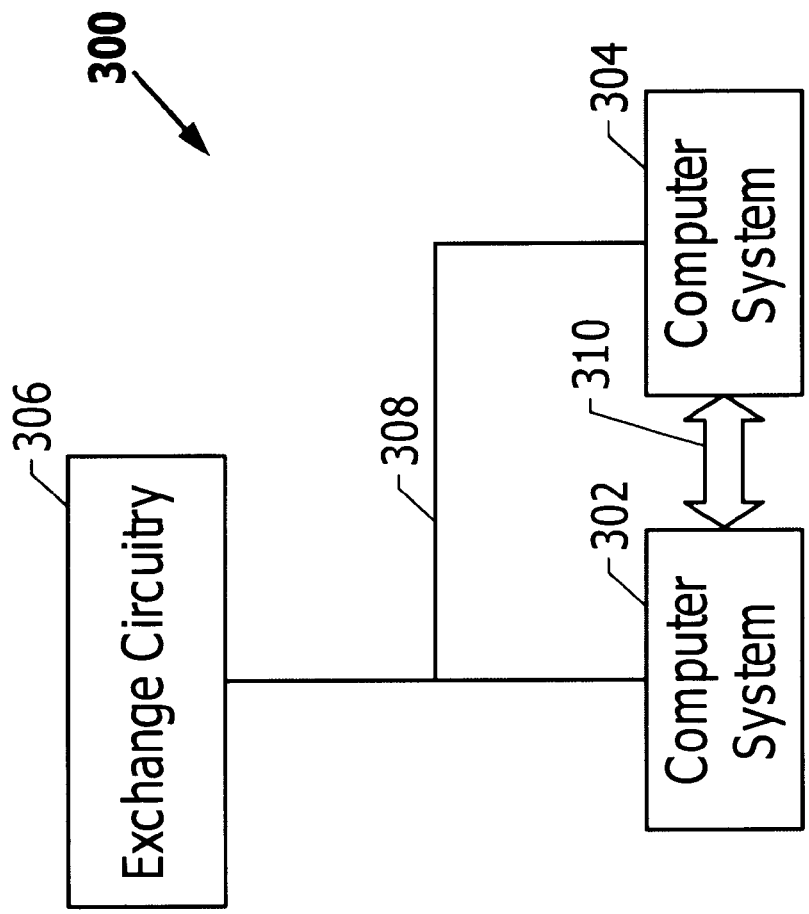
FIG. 3 is a block diagram of another exemplary computer network having multiple computer systems communicatively coupled to each other and to exchange circuitry.

FIG. 3 is a block diagram of another exemplary computer network 300 having multiple computer systems 302 and 304 communicatively coupled to each other and to exchange circuitry 306. Computer systems 302 and 304 communicate with each other and with exchange circuitry 306 to access external communication channels, e.g., external telephone networks. The computer network 300 operates with communication devices, such as modems (not shown), in each of the computer systems 302, 304, and, in this embodiment, transfers communication signals using telephone lines 308. However, even if all communication signals are actually transferred across the telephone lines 308, a logical communication channel 310 is created between the computer systems 302 and 304.

This logical communication channel 310 represents a local network that provides each computer system 302, 304 access to the peripherals on the other system. For example, the computer system 302 may choose to print from a printer that is mechanically coupled to the computer system 304. Further, while printing, the computer system 302 may maintain a previously established communication channel to the Internet through the exchange circuitry 306 and allow the computer system 304 to access this communication channel without detrimentally affecting communications on the channel. Essentially, the computer network 300 communicates with the communication devices or modems of the computer systems 302 and 304.

Figure 4:
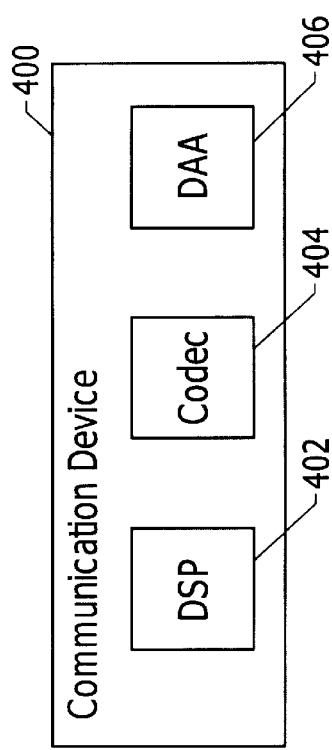
FIG. 4 is a block diagram of an exemplary communication device according to principles of the present invention.

FIG. 4 is a block diagram of an exemplary communication device 400 according to principles of the present invention. For ease of understanding, the communication device 400 described herein is a modem, however, it should be noted that the communication device 400 could be any device that enables computer systems to communicate across communication channels. The communication device 400 includes a digital signal processor (DSP) 402, a codec (compressor/decompressor) 404, and a digital access arrangement (DAA) 406. The DSP 402 enables communication signals to pass to or from the DSP 402 while retaining the frequency spectrum of the original communication signal.

In the past, communication signals that were transmitted at a frequency greater than the voice band would be disregarded by modems because DSPs were designed only to pass communication signals over telephone networks having exchange circuitry. The exchange circuitry (then and now) includes very strong low pass filters to filter out frequencies that are above the voice band. Thus, if the modems communicate over a telephone network having exchange circuitry, the DSP has no need to transmit or receive signals at a frequency higher than the voice band and have not been designed to recognize such frequencies.

In the present invention, DSP 402 is designed to recognize frequencies both above and below the voice band frequencies through frequency division multiplexing. Advantageously, this design allows communication devices, e.g., modems, to communicate at both voice band and higher frequencies. Thus, modems according to the present invention can communicate at standard voice band frequencies and at frequencies well above the voice band. This allows modems to communicate at each level of a telephone network, each level being delimited by exchange circuitry or the like. For example, when modems communicate on a telephone network without exchange circuitry, e.g., a telephone line network within a home or residence, the modems can use a frequency greater than the voice band to communicate with other modems located on the home telephone network and can also use voice band frequency to communicate with modems located outside the home telephone network. Thus, the communication device 400 provides the ability to communicate with other communication devices on a network bounded by exchange circuitry as well as to communicate with other communication devices exterior to the exchange circuitry.

Figure 5:
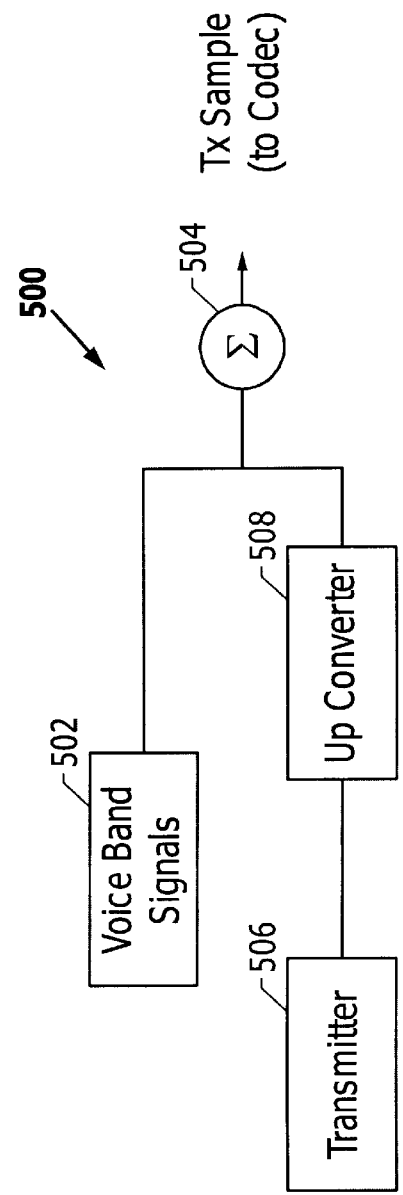
FIG. 5 is a block diagram of a transmit portion of a digital signal processor (DSP) of the communication device of FIG. 4.

FIG. 5 is a block diagram of a transmit portion 500 of the digital signal processor (DSP) 402 of the communication device 400. The transmit portion 500 receives both voice band signals 502 and other signals through the DSP 402 and combines those signals with a summer 504 for transmission on a single communication channel to the codec 404. A transmitter 506 and an up converter 508 assure that non-voice band signals are transmitted at a high frequency that is easily distinguishable from the voice band signals 502 when the combined signal is received at another DSP.

Figure 6:
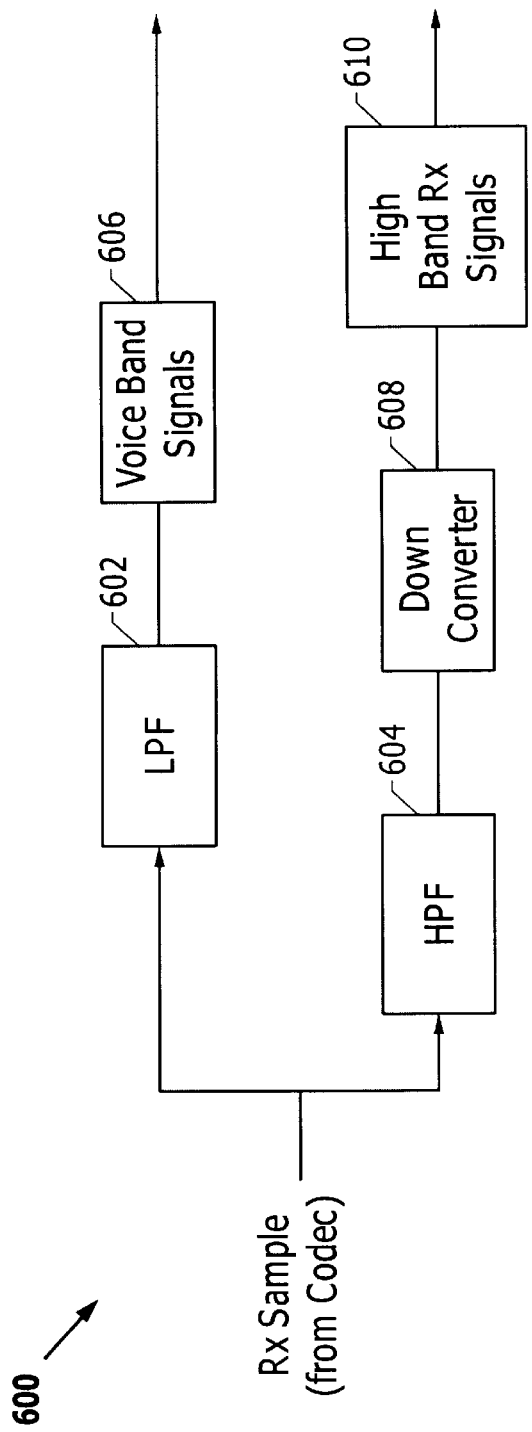
FIG. 6 is a block diagram of a receive portion of the DSP of the communication device of FIG. 4.

FIG. 6 is a block diagram of a receive portion 600 of the DSP 402 of the communication device 400. The receive portion 600 receives signals from the codec 404 on a single communication channel and implements a low pass filter (LPF) 602 and a high pass filter (HPF) 604 to divide voice band signals from non-voice band signals. After the signals pass through the LPF 602, a communication channel for voice band signals 606 is created, and after the signals pass through the HPF 604, a down converter 608 converts the signals to appropriate high band receive signals 610 to create another communication channel in the DSP 402. Thus, the communication device 400 provides communication for both voice band and non-voice band signals.

Figure 7:
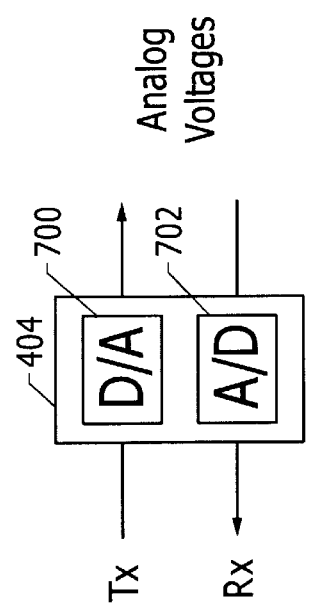
FIG. 7 is a block diagram of a codec portion of the communication device of FIG. 4.

FIG. 7 is a block diagram of a codec 404 portion of the communication device 400. The codec 404 essentially comprises a digital to analog converter (D/A) 700 and an analog to digital converter (A/D) 702. The D/A 700 receives digital signals that are transmitted from the DSP 402 and converts those signals to analog voltages for transmission on a telephone line. The A/D 702 receives analog voltage signals from the telephone line and converts them to digital signals that are received at the DSP 402.

Figure 8:
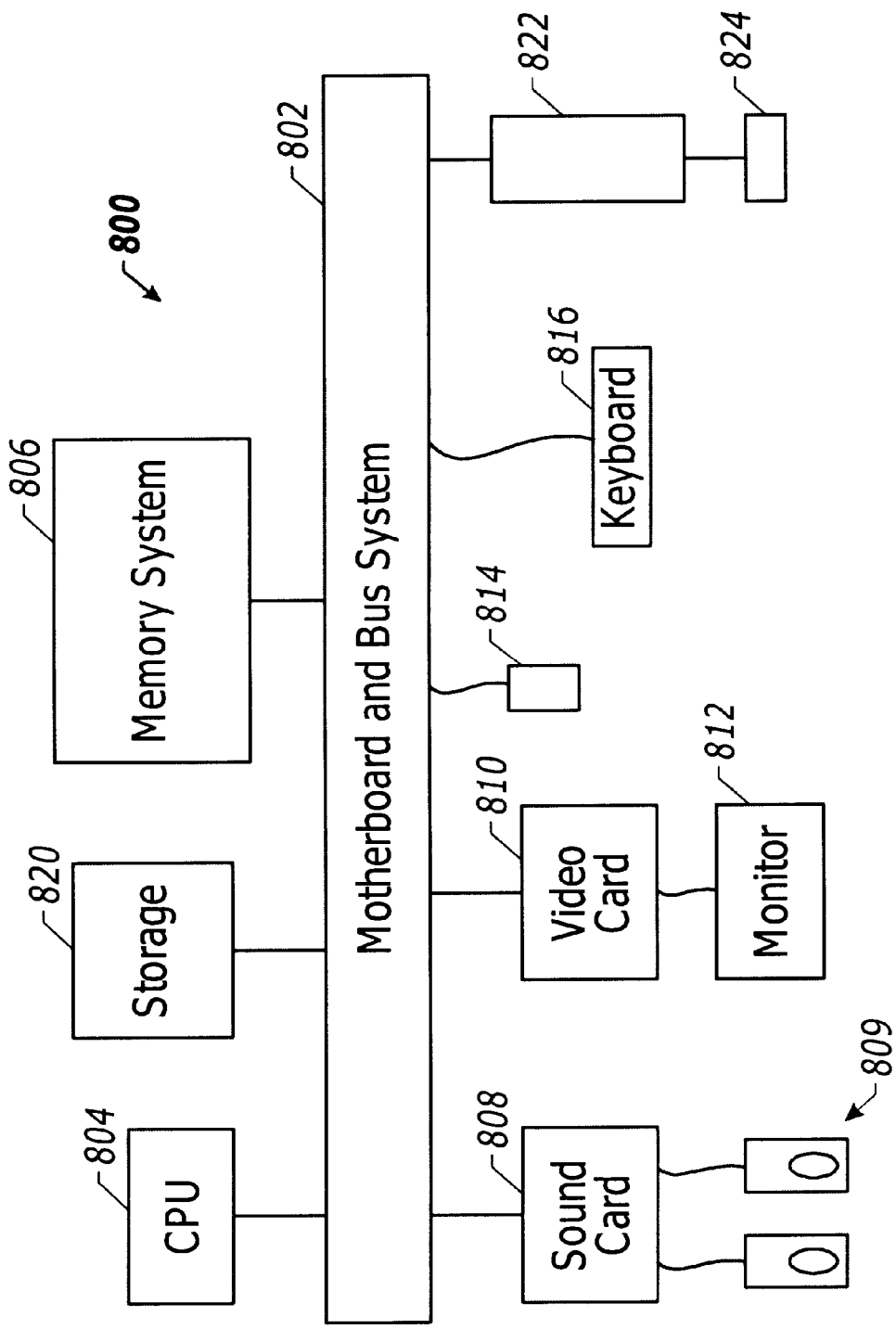
FIG. 8 is a block diagram of an exemplary computer system for practicing preferred embodiments of the present invention.

FIG. 8 is a block diagram of an exemplary computer system 800 for practicing preferred embodiments of the present invention. The computer system 800 is preferably an IBM-compatible, personal computer (PC) system or the like, and includes a motherboard and bus system 802 coupled to at least one central processing unit (CPU) 804 and a memory system 806. The motherboard and bus system 802 include any kind of bus system configuration, such as any combination of a host bus, one or more peripheral component interconnect (PCI) buses, an industry standard architecture (ISA) bus, an extended ISA (EISA) bus, microchannel architecture (MCA) bus, etc., along with corresponding bus driver circuitry and bridge interfaces, etc., as known to those skilled in the art. The CPU 804 preferably incorporates any one of several microprocessors, such as the 80486, Pentium™, Pentium II™, etc. microprocessors from Intel Corp., or other similar type microprocessors such as the K6 microprocessor by Advanced Micro Devices, and supporting external circuitry typically used in PCs. The external circuitry preferably includes an external or level two (L2) cache or the like (not shown). The memory system 806 may include a memory controller or the like and be implemented with one or more memory boards (not shown) plugged into compatible memory slots on the motherboard, although any memory configuration is contemplated.

The computer system 800 includes one or more output devices, such as speakers 809 coupled to the motherboard and bus system 802 via an appropriate sound card 808 and a monitor or display 812 coupled to the motherboard and bus system 802 via an appropriate video card 810. One or more input devices may also be provided such as a mouse 814 and a keyboard 816, each coupled to the motherboard and bus system 802 via appropriate controllers (not shown) as known to those skilled in the art. A storage system 820 is coupled to the motherboard and bus system 802 and may include any one or more data storage devices, such as one or more disk drives including floppy and hard disk drives, one or more CD-ROMs, one or more tape drives, etc. Other input and output devices may also be included, as well as other types of input devices including a microphone, joystick, pointing device, voice recognition, etc. The input and output devices enable a user to interact with the computer system 800 for purposes of data acquisition and perusal, as further described below.

The motherboard and bus system 802 may be implemented with at least one expansion slot 822, which is configured to receive compatible adapter or controller cards configured for the particular slot and bus type. Typical devices configured as adapter cards include network interface cards (NICs), disk controllers such as a SCSI (Small Computer System Interface) disk controller, video controllers, sound cards, etc. The computer system 800 may include one or more of several different types of buses and slots, such as PCI, ISA, EISA, MCA, etc. Each slot 822 is configured to receive an expansion card 824, such as a sound card, a modem card, a network interface controller (NIC) or adapter, etc.

Other components, devices and circuitry are normally included in the computer system 800 but are not particularly relevant to the present invention and are not shown. Such other components, devices and circuitry are coupled to the motherboard and bus system 802, such as, for example, an integrated system peripheral (ISP), an interrupt controller such as an advanced programmable interrupt controller (APIC) or the like, bus arbiter(s), one or more system ROMs (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc. Although the present invention is illustrated with an IBM-compatible type PC system, it is understood that the present invention is applicable to other types of computer systems and processors as known to those skilled in the art.

The communication system according to the present invention provides computer systems with the ability to communicate with each other on a local telephone network, i.e., a telephone network without exchange circuitry, while concurrently communicating with other communication systems outside the local telephone network. These respective communications occur without interference from the other. A communication network of this nature creates a desirable configuration for a home LAN because existing telephone wires in the home are used both as part of the home LAN and as an interface to exterior communication systems. Thus, the communication devices of the present invention are desirable for, among other things, implementing home LAN systems.

The above-listed sections and included information are not exhaustive and are only exemplary for computer communication systems. The particular sections and included information in a particular embodiment may depend upon the particular implementation and the included devices and resources. Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A communication system comprising:
   a first communication device having a first digital signal processor and a first codec;
   a communication channel;
   a second communication device having a second digital signal processor and a second codec, the second communication device being communicatively coupled with the first communication device via the communication channel;
   the first digital signal processor enabling frequency division multiplexed sampling of signals from the first codec; and
   the second digital signal processor enabling receipt of the division multiplexed sampling of signals from the first digital signal processor such that the sampling of signals is transmitted to the second codec in a manner so as not to interfere with other communications between the first communication device and at least a third communication device.

2. The communication system of claim 1 wherein the communication channel comprises a telephone wire network without exchange circuitry.

3. The communication system of claim 1 wherein the communication channel comprises a telephone wire network within a premises.

4. The communication system of claim 1 wherein the first communication device and the second communication device each comprise a voice band modem.

5. The communication system of claim 1 wherein the first communication device communicatively couples with at least one external communication device via another communications channel and communicates with the at least one external communication device transparently to the communications between the first communication device and the second communication device.

6. The communication system of claim 1 wherein the first communication device communicates with the second communication device outside of the voice band.

7. The communication system of claim 1 further comprising a first processor associated with the first communication device such that the first processor influences, via the communication channel, operation of peripheral devices that are coupled to a second processor associated with the second communication device.

8. A method for communicating between a first and a second computer system, the first computer system having a first voice-band modem and the second computer system having a second voice-band modem, the first voice-band modem and the second voice-band modem communicatively coupled across a telephone line network, the method comprising:
   configuring the first voice band modem to transmit and receive signals at frequencies both within and without the voice band via frequency division multiplexed sampling of the signals between the first and second voice-band modems;
   configuring the second voice band modem to transmit and receive signals at frequencies both within and without the voice band via frequency division multiplexed sampling of the signals between the first and second voice-band modems;

transmitting signals from the first computer system to the second computer system across the telephone line network at a frequency outside of the voice band without interfering with voice band communications of the first computer system; and receiving, from the telephone line network, signals at the second computer system at the frequency outside of the voice band without interfering with voice band communications between the second computer system and at least a third communication system.

9. The method of claim 8 further comprising:

transmitting signals from the second computer system to the first computer system across the telephone line network at a frequency outside of the voice band without interfering with voice band communications of the second computer system; and receiving, from the telephone line network, signals at the first computer system at the frequency outside of the voice band without interfering with voice band communications of the first computer system.

10. The method of claim 8 further comprising:

controlling, with the first computer system and through communications across the telephone line network, peripheral devices attached to the second computer system, the communications passing transparently to other communications on the telephone line network.

11. A communication system comprising:

a first voice band modem;

a second voice band modem;

a telephone wire network within a premises and without exchange circuitry within the premises; and the first voice band modem communicatively coupled to the second voice band modem via the telephone wire network such that the first voice band modem communicates, outside of the voice band, with the second voice band modem via frequency division multiplexed sampling of communication signals between the first and second voice-band modems so as not to interfere with other communications between the first voice band modem and a third communication device.

12. The communication system of claim 11 wherein the first voice band modem is communicatively coupled across another telephone wire network to another communication device for voice band communications.

13. The communication system of claim 11 wherein the communication signals between the first voice band modem and the second voice band modem are multiplexed in the frequency domain.

14. The communication system of claim 11 wherein the communication signals between the first voice band modem and an external communication device are multiplexed in the frequency domain.

15. The communication system of claim 11 wherein the first voice band modem communicates with an external communication device that is communicatively coupled to the first voice band modem on a communication network external to the telephone wire network within the premises, the communication occurring transparently to the communications between the first voice band modem and the second voice band modem.

16. The communication system of claim 11 wherein the first voice band modem is associated with a processor, wherein the processor is allowed to operate peripheral devices of another processor that is associated with the second voice band modem.

17. A telephone line network system comprising:

telephone lines configured to allow communications between network devices;

a plurality of network devices communicatively coupled to the telephone lines, each of the plurality of network devices including a communication module that enables communication between at least two of the plurality of network devices via frequency division multiplexed sampling of communication signals between the at least two of the plurality of network devices so as not to interfere with other communications between the at least two of the plurality of network devices and at least one other network device;

at least one communication channel on the telephone lines that enables the communication between the at least two of the plurality of network devices; and each of the plurality of network devices including a control module that enables each network device to selectively communicate on the at least one communication channel.

18. The telephone line network system of claim 17, including a standard telephone communicatively coupled thereto, wherein the communication module comprises:

detection circuitry that indicates appropriate communication channels to activate for each of the plurality of network devices according to a mode of the standard telephone.

19. The telephone line network system of claim 17 wherein the at least one communication channel comprises a voice band channel and a non-voice band channel.

* * * * *